Nov. 4, 1958 S. HORENSTEIN 2,858,638
ANIMAL TRAP
Filed Aug. 1, 1957
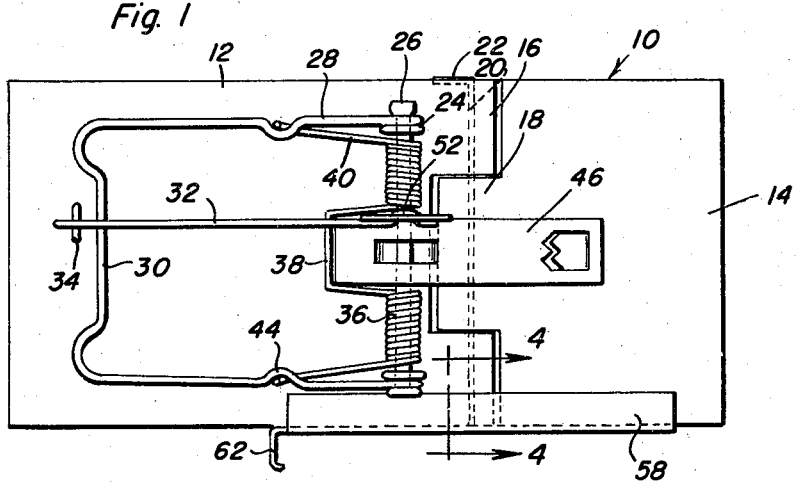
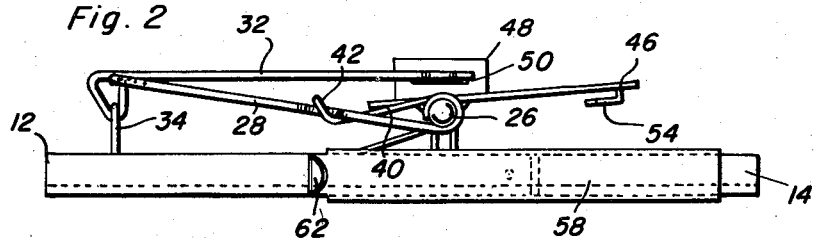
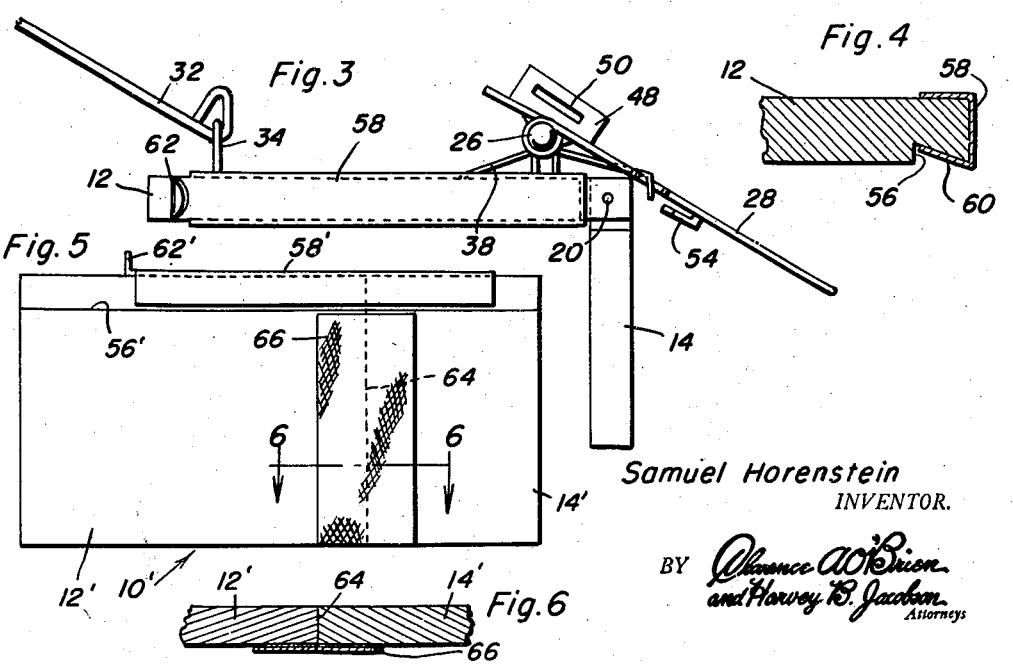
Samuel Horenstein
INVENTOR.

000
United States Patent Office 2,858,638
Patented Nov. 4, 1958

2,858,638

ANIMAL TRAP

Samuel Horenstein, Waltham, Mass.

Application August 1, 1957, Serial No. 675,625

6 Claims. (Cl. 43—81)

This invention generally relates to novel structural improvements in small animal traps that are primarily constructed for catching small animals such as rats, mice, or other rodents but which may be constructed of various sizes for trapping various size animals.

An object of the present invention is to provide an animal trap having a spring-urged wire bail jaw incorporating means in its construction to facilitate the release of the animal after it has been caught without requiring the user to engage his hands with the animal.

As is well known, small animals such as rats and mice carry on their fur germs of various types and the unloading or removing of a mouse or rat from an animal trap is a generally distasteful chore. Thus, it is the primary object of the present invention to provide a pivoted platform which is actually a part of the base which underlies the bait holder or trigger and is adapted to be engaged by the spring jaw of the trap when the trap is sprung thus capturing the animal therebetween together with means for releasing this pivoted platform so that it may pivot to a position perpendicular to the remainder of the base and away from the spring jaw thus releasing the animal from between the platform and the spring jaw.

Another object of the present invention is to provide an animal trap in accordance with the preceding objects in which the release mechanism for the platform is operated remotely therefrom and does not affect the over-all vertical height of the base and platform but yet which is effective for retaining the base and platform in aligned relation during normal use of the trap.

A further important feature of the present invention is to provide an animal trap in accordance with the preceding object in which novel means is provided for hingedly connecting the pivotal platform to the remainder of the base.

Other objects of the present invention will reside in its simplicity of construction, ease of use, adaptation for construction from wood, metal or plastic or any suitable material, its ease of use and its relatively inexpensive manufacturing cost.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a plan view of the animal trap of the present invention showing the platform together with the base and the associated equipment normally found in an animal trap;

Figure 2 is a side elevational view of the construction of Figure 1;

Figure 3 is a side elevational view of the construction of Figure 2 showing the platform pivoted downwardly to an inoperative position for releasing the animal;

Figure 4 is a detail sectional view showing the details of construction of the slide member which retains the platform and base in aligned condition;

Figure 5 is a bottom plan view showing a modified form of the invention illustrating an adhesive tape construction for pivotally securing the platform to the base of the trap; and Figure 6 is a detail sectional view taken substantially upon a plane passing along section line 6—6 of Figure 5 illustrating further structural details of the adhesive tape pivot hinge means.

Referring now specifically to the drawings, the numeral 10 generally designates the animal trap of the present invention including a base 12 and a platform 14 forming an extension and continuation thereof when in normal position. The base 12 is provided with a pair of longitudinally extending legs 16 bridging and receiving therebetween a longitudinal projection 18 on the platform 14 wherein the legs 16 and projection 18 are interdigitated with a transversely extending wire hinge pin 20 extending therethrough thus hingedly connecting the platform 14 to the base 12. One end of the hinge pin 20 is provided with a laterally extending portion 22 which may be used to impart driving force to the pin 20 if necessary or which may be used for extracting the pin 20 if this becomes necessary.

Supported on the upper surface of the base 12 is a pair of upstanding eye members 24 having a transverse axle 26 extending therebetween and therethrough. Pivotally mounted on the axle 26 is a U-shaped wire bail which acts as a spring jaw and is designated by the numeral 28. The bight portion 30 of the bail 28 is provided with an inwardly offset transverse portion for underlying the latch bar or catch bar 32 which is swingably connected to an upstanding eye member 34 adjacent the outer end of the base 12.

Also surrounding the axle 26 is an axial coil spring 36 which is actually double wound and provided with a central portion 38 engaging the upper surface of the base 12 and a pair of free end portions 40 having hook ends 42 engaged with recesses 44 in the legs of the U-shaped bail 28 whereby the bail 28 will be urged towards the platform 14 in the usual manner. It is pointed out that other spring arrangements may be employed with either a single or double spring depending upon the strength requirements necessary.

Also pivotally mounted upon the center of the axle 26 is the bait carrier or trigger 46 having an upstanding plate 48 with a slot 50 therein for receiving a projection 52 on the catch bar 32 for retaining the bail 28 in retracted or loaded position whereby the trap is then ready for springing upon depression of the trigger 46 by the weight of the animal being trapped. The outer end of trigger 46 is provided with a downwardly or upwardly struck hook member 54 for receiving bait thereby attracting animals to the trigger for springing the trap in the usual manner.

One side edge of the base 12 as well as the platform 14 is provided with an upwardly extending groove 56 in the bottom thereof which has an inclined top wall terminating at the outer corner of the side edge. Slidably disposed on this side edge is a generally channel-shaped slide 58 which has one leg thereof overlying and engaging the top of the base and platform 14, the bight portion thereof engaging the outer edge of the base and platform with the lower leg engaged in the groove 56 with the lower leg designated by numeral 60 being upwardly inclined for engagement with the upper or inner wall of the groove 56 thereby preventing accidental disengagement of the slide 58 from the base 12 and platform 14 by lateral pressure being exerted thereon.

The end of the slide 58 which is disposed nearest to the bight portion 30 of the U-shaped bail or jaw 28 is provided with a laterally extending manipulating handle 62 which may be curved and rounded for ease of manipulation thereof whereby the slide 58 may be moved longitudinally in relation to the base and platform.

In normal use of the invention, the slide 58 is in the position shown in Figure 1 with the base 12 and platform 14 in longitudinal alignment as shown in Figure 2. After the animal has been caught and it is desired to release the same from the trap, it is only necessary to grasp the base 12 remote from the platform 14 and engage the handle 62 and slide the slide 58 towards the free end of the base 12 thus permitting the platform 14 to be pivoted downwardly to a perpendicular position as shown in Figure 3 whereby the animal will be readily released and deposited by gravity in any suitable receptacle or in any suitable place.

Referring now specifically to Figures 5 and 6, the numeral 10' generally designates a modified form of the invention which for all practical purposes is the same as the above except that the base 12' and platform 14' are provided with smooth abutting edges with these smooth edges defined by reference numeral 64 being secured in adjacent relation by a piece of flexible fabric-like material 66 which may be fabric, plastic and may be provided with an adhesive coating of the type that will adhere to plastic, metal or wood for permanently forming a hinge between the base 12' and platform 14' whereby the slide 58' will operate in the same manner as in the device shown in Figures 1–4.

Thus, the present invention incorporates the construction of a mouse trap which may be constructed of wood, plastic, metal or any other suitable material and may even incorporate any combination of the various materials which may be most economical. Also, the wire hinge as well as the tape hinge may be employed and the various size relationships may vary in accordance with the dictates of the particular use for which the trap is intended.

Since numerous modifications and changes will readily occur to those skilled in art, it is not desired to limit the invention to the exact construction and operation shown and described, and accordingly all suitable modifications and equivalents may be resorted to, falling within the scope of the invention as claimed.

What is claimed as new is as follows:

1. An animal trap comprising a base having a spring actuated pivoted jaw thereon, a platform pivoted to one end of said base, and a sliding member mounted on one edge of said base and engaging one edge of the platform for retaining the base and platform in aligned coplanar relation.

2. An animal trap comprising a base having a spring actuated pivoted base thereon, a platform pivoted to one end of said jaw, a sliding member mounted on one edge of said base and engaging one edge of the platform for retaining the base and platform in aligned coplanar relation, said sliding member being substantially channel-shaped and provided with a laterally extending handle for manipulation thereof.

3. The combination of claim 2, wherein a hinge pin is provided for pivotally connecting the base and platform.

4. The combination of claim 2, wherein a flexible member bridges the juncture line on the lower surface of the base and platform.

5. The combination of claim 2, wherein said channel-shaped sliding member is provided with an upwardly inclined lower leg received in a groove formed in the bottom of the base and platform thereby retaining the sliding member on the base and platform.

6. The combination of claim 2, wherein a flexible member bridges the juncture line on the lower surface of the base and platform, said flexible member being adhesively secured to the undersurface of the base and platform.

No references cited.